(12) United States Patent
McClurg et al.

(10) Patent No.: US 7,048,424 B2
(45) Date of Patent: May 23, 2006

(54) LIGHT INTEGRATING COLUMN

(75) Inventors: George W McClurg, Jensen Beach, FL (US); John F Carver, Palm City, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 0 days.

(21) Appl. No.: 10/640,689

(22) Filed: Aug. 14, 2003

(65) Prior Publication Data

US 2004/0130908 A1    Jul. 8, 2004

Related U.S. Application Data

(60) Provisional application No. 60/402,915, filed on Aug. 14, 2002.

(51) Int. Cl.
*F21V 7/04* (2006.01)

(52) U.S. Cl. .................. 362/552; 362/84; 362/268; 362/296; 362/310

(58) Field of Classification Search ........... 362/552, 362/84, 268, 296, 299, 302, 310, 800, 252; 356/71

See application file for complete search history.

(56) References Cited

U.S. PATENT DOCUMENTS

| | | | |
|---|---|---|---|
| 893,060 A | | 7/1908 | Dobbins |
| 4,321,630 A | * | 3/1982 | Kramer .................. 358/480 |
| 4,575,252 A | | 3/1986 | Akiyama |
| 4,868,383 A | | 9/1989 | Kurtz et al. |
| 4,941,723 A | | 7/1990 | Sasada |
| 5,079,678 A | * | 1/1992 | Parker ..................... 362/84 |
| 5,803,592 A | * | 9/1998 | Lawson .................. 362/300 |
| 5,920,384 A | * | 7/1999 | Borza ..................... 356/71 |
| 5,997,150 A | * | 12/1999 | Anderson ................ 362/227 |
| 6,088,117 A | | 7/2000 | Imura et al. |
| 6,505,957 B1 | * | 1/2003 | Chuang ................... 362/268 |
| 6,517,210 B1 | * | 2/2003 | Peterson et al. ............ 353/98 |

* cited by examiner

*Primary Examiner*—John Anthony Ward
*Assistant Examiner*—Mark Tsidulko
(74) *Attorney, Agent, or Firm*—Sterne, Kressler, Goldstein & Fox, P.L.L.C.

(57) ABSTRACT

A light integrating column having an illumination column and windows that allow light to enter and exit the illumination column. The illumination column can be a solid rod or a hollow tube. In an embodiment, the windows are formed at an angle with respect to each other. Light from a light source enters through one of the windows. The light is internally reflected and diffused inside the illumination column. A diffused uniform light is transmitted out through another window. In an embodiment, a reflective coating is applied to a surface of the illumination column.

16 Claims, 6 Drawing Sheets

LIGHT INTEGRATING COLUMN

BACKGROUND OF THE INVENTION

1. Field of the Invention

The present invention relates to the field of live print scanning.

2. Background Art

Traditionally, techniques for obtaining a print image have included application of ink to a person's fingertips, for instance, and rolling or simply pressing the tips of the individual's fingers to appropriate places on a recording card. This technique can be very messy due to the application of ink, and may often result in a set of prints that are difficult to read.

Today, print scanning technology includes electro-optical devices for capturing images of a print pattern found on a biometric object, such as, a finger, a palm, a foot, etc. In such instances, the electro-optical device may be a fingerprint scanner, a palm scanner, or another type of biometric scanner. These scanners are also referred to as live print scanners. Live print scanners do not require the application of ink to a person's finger or palm. Instead, live print scanners may include a prism located in an optical path. A platen is used as the surface for receiving the biometric object. For example, with an optical fingerprint scanner, a finger is placed on the platen, and a camera detects an image of the fingerprint. The platen can be a surface of the prism or any other surface provided on the prism and in optical contact with the prism. The fingerprint image detected at the camera is comprised of relatively light and dark areas. These areas correspond to the valleys and ridges of the fingerprint.

Live print scanners typically utilize the optical principle of total internal reflection (TIR). The rays from a light source internal to these optical scanners reach the platen at an incidence angle that causes all of the light rays to be reflected back. This occurs when the angle of incidence is equal to or greater than the critical angle, which is defined at least in part by the ratio of the two indices of refraction of the medium inside and above the surface of the platen.

In the case of a live fingerprint scanner, one or more fingers are placed on the platen for obtaining a fingerprint image. In a TIR live print scanner, ridges on a finger operate to alter the refraction index at the platen, thereby interrupting the TIR of the prism. This interruption in the TIR causes an optical image of the ridges and valleys of a fingerprint to be propagated through the receiving surface and captured by a camera internal to the device.

In many live scan applications, illumination intensity needs to be even across a platen surface to allow capture of a high-quality image. Individual light emitters, however, can have an uneven light distribution. For example, an array of light emitters has an uneven light distribution due to its discrete light sources. A fluorescent tube also has an uneven light distribution across its length. There is a need for systems capable of illuminating an area of the platen with a diffuse uniform light.

BRIEF SUMMARY OF THE INVENTION

The present invention relates to systems for providing a diffuse uniform light. In an embodiment, the present invention includes a light integrating column having an illumination column and windows that allow light to enter and exit the illumination column. A window may be, for example, a physical opening in the illumination column, a treated portion of the illumination column, or an uncoated surface of the illumination column. One window serves as the light input source into the illumination column. Another window serves as the light output source from the illumination column. The two windows are placed at an approximately ninety-degree angle with respect to each other.

Light from a light source enters through one window into the illumination column. The light is internally reflected and diffused inside the illumination column. A diffused uniform light is transmitted out through another window in the illumination column.

In an embodiment, the illumination column is made from a transparent solid rod and the outside surface of the illumination column is covered with a reflective material. In another embodiment, the illumination column is a hollow tube. The inside of the hollow tube is coated with a reflective coating. In an embodiment, the hollow tube is manufactured from a transparent material, and the outside of the hollow tube is coated with a reflective coating.

In an embodiment, the present invention is used to provide uniform, diffuse, linear illumination to the underside of a platen, thereby allowing a high-quality, print image of an object placed on the platen to be obtained. The present invention may also be used to illuminate the interior of a curved platen.

Further embodiments, features, and advantages of the present invention, as well as the structure and operation of the various embodiments of the present invention are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention.

Figure 1A:
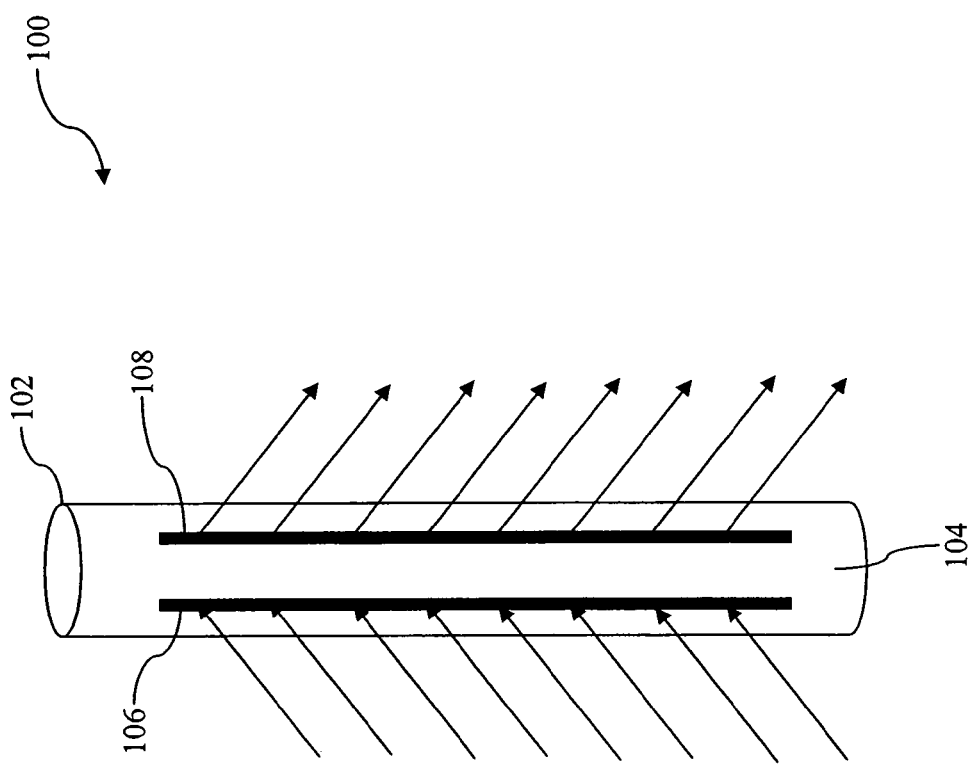
FIG. 1A is an isometric view of a light integrating column according to an embodiment of the present invention.

The features, objects, and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

FIG. 1A is an isometric view of a light integrating column 100. The light integrating column 100 includes an illumination column 102 having an outside surface 104, a first window 106, and a second window 108. Additional windows can be added as needed. In an embodiment, first window 106 and second window 108 are arranged at a right angle so that the direction of light entering first window 106 is approximately perpendicular to the direction of light exiting second window 108. This is illustrative. First and second windows 106 and 108 can be arranged at other smaller or larger angles than a right angle to one another.

Figure 1B:
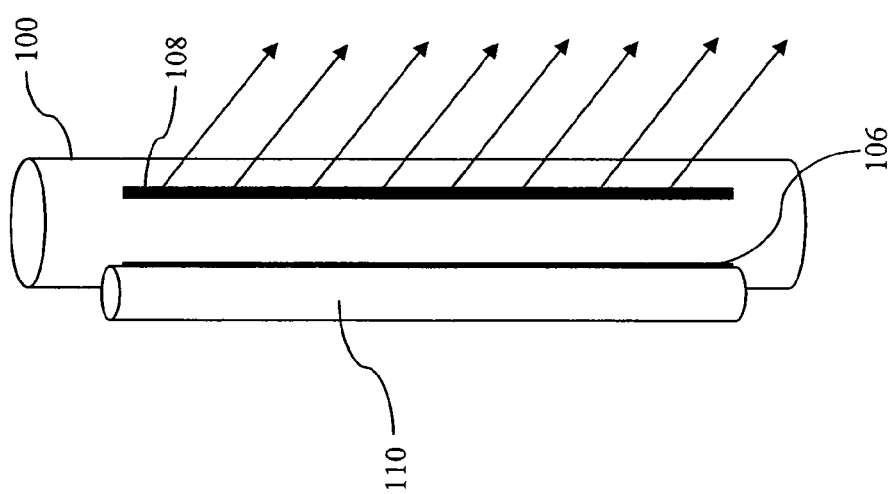
FIG. 1B is a second isometric view of a light integrating column according to an embodiment of the present invention.

As shown in FIG. 1B, light from an external light source 110 enters first window 106. In one embodiment, external light source 110 includes an array of light-emitting diodes ("LEDs"). In another embodiment, external light source 110 includes a linear light source, such as, for example, a standard fluorescent tube or a cold cathode fluorescent tube. One of skill in the art given this description will recognize that other types of external sources may be used.

Light integrating column 100 diffuses and integrates the light from external light source 110 inside illumination column 102. After the light is diffused and integrated, it exits through second window 108. The light exiting through second window 108 is a uniform, diffused light having a direction approximately perpendicular to the direction of light entering through first window 106.

In an embodiment, illumination column 102 is a solid rod manufactured from a material capable of light transmission, such as, but not limited to, glass, fused silica, or plastic. In this embodiment, illumination column 102 is covered with a reflective material or a reflective coating that efficiently diffuses incident light. In one embodiment, this reflective material or coating is paint, such as, for example, reflective white paint. The invention is not limited, however, to using only white paint. Colors other than white can be used and may be preferable depending on the wavelengths of light emitted, for example, by external light source 110. Coatings other than paints can also be used. The outside surface 104 of illumination column 102 can be ground or frosted prior to applying the reflective coating to enhance diffusion of incident light.

In an embodiment where illumination column 102 is a solid rod, first and second windows 106 and 108 are not physical openings in the solid rod. In an embodiment, first and second windows 106 and 108 are areas on the surface of illumination column 102 that have been altered in some manner. For example, first and second windows 106 and 108 may be areas where the surface of illumination column 102 is flattened. In another example, the surface of illumination column 102 may have its curvature changed at the location of first and second windows 106 and 108 by, for example and as shown by the dotted lines in FIG. 2A, making the surface more convex or concave. These changes to the surface of illumination column 102 may occur at the location of one or both of first and second windows 106 and 108. In an embodiment where a reflective material or coating is applied to illumination column 102, windows 106 and 108 are areas of illumination column 102 that are not covered by the reflective material or coating.

In another embodiment, illumination column 102 is manufactured from a hollow tube. In this embodiment, the reflective coating is applied to the inside surface of the hollow tube. In an embodiment, illumination column 102 is a transparent tube filled with air. In this embodiment, the reflective coating is applied to either the inside or outside surface of the transparent tube. Windows similar to first window 106 and second window 108 shown in FIGS. 1A and 1B allow light to enter and exit the tube. In one embodiment, illumination column 102 is a clear plastic tube.

In another embodiment, illumination column 102 is a white tube such as, for example, PVC tube, and first and second windows 106 and 108 are physical openings or slits that allow light to enter and exit illumination column 102. In an embodiment where illumination column 102 is a PVC tube or the like, the inner surface of the tube may be treated to enhance diffusion. For example, the inner surface of the tube may be roughened.

Figure 2B:
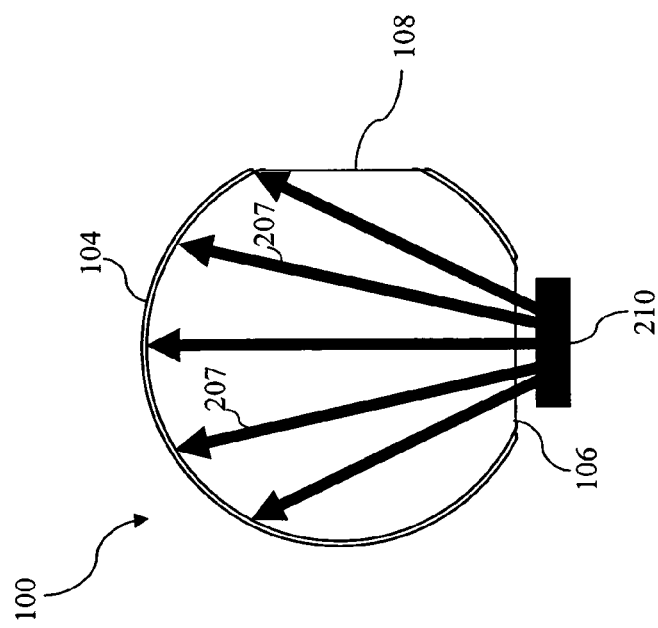
FIG. 2B is a cross-sectional view of a light integrating column according to an embodiment of the present invention, showing input light travel paths through the light integrating column.
Figure 2A:
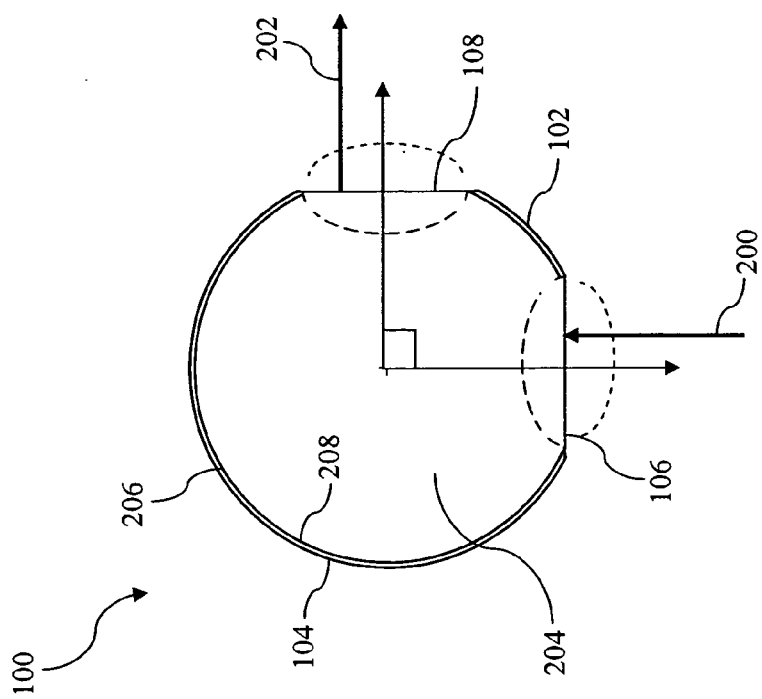
FIG. 2A is a cross-sectional view of a light integrating column according to an embodiment of the present invention.

FIG. 2A is a cross-sectional view of an embodiment of light integrating column 100. The embodiment of FIG. 2A includes first window 106 perpendicular to second window 108. The direction of input light 200 entering through first window 106 is perpendicular to the direction of exit light 202 exiting through second window 108. The interior of light integrating column 100 includes a light-transparent material 204, such as, for example, glass, plastic, air, etc. As discussed above, depending on the nature of light-transparent material 204, reflective material 206, if applied, may be applied to surface 208. In an embodiment where the illuminator is a solid rod, surface 208 is the outside surface of the rod. When the illuminator is a tube, surface 208 is the inside surface of the tube.

FIG. 2B is another cross-sectional view of an embodiment of light integrating column 100, showing selected rays of input light 207 entering illumination column 102 from an external light source 210. Input light from external light source 210 is emitted into first window 106 and travels in a variety of directions inside illumination column 102.

Figure 2D:
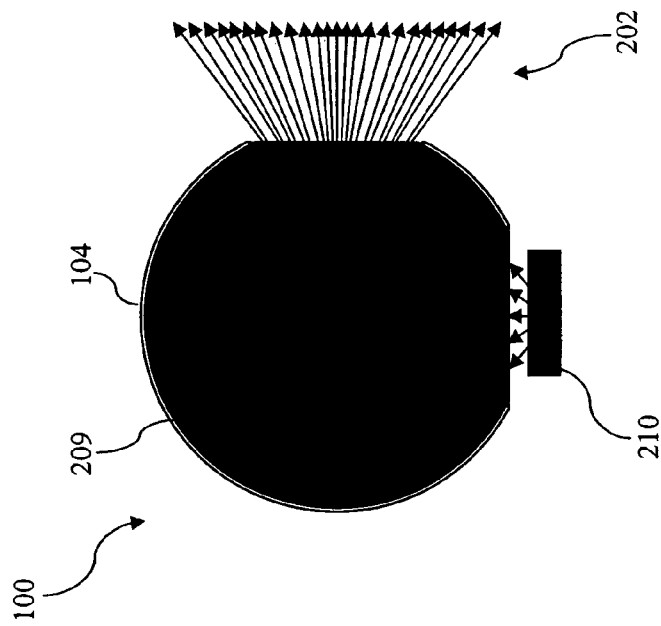
FIG. 2D is cross-sectional view of a light integrating column according to an embodiment of the present invention, showing a steady state of light in the light integrating column.
Figure 2C:
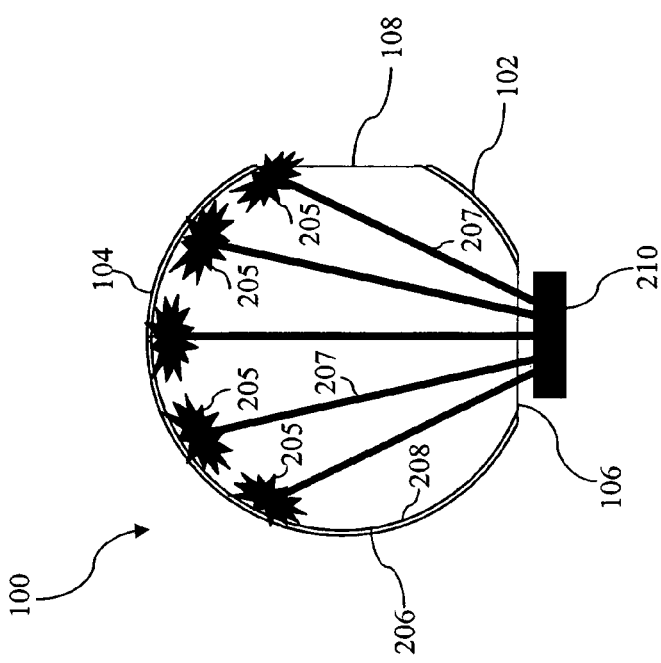
FIG. 2C is a cross-sectional view of a light integrating column according to an embodiment of the present invention, showing how light is diffused.

FIG. 2C is another cross-sectional view of an embodiment of light integrating column 100 showing light travel and reflection paths through illumination column 102. The input light from external light source 210, emitted into first window 106, reflects off of the surface of illumination column 102. For example, in an embodiment, the inside of illumination column 102 is made from a transparent material and surrounded by reflective material 206, and the light is capable of being reflected back into illumination column 102. Therefore, the light is efficiently diffused.

Reflected light 205 crosses illumination column 102 again until it either exits through second window 108 or again comes in contact with a light reflecting surface (the surface 208 of illumination column 102). This process is infinitely repeated.

FIG. 2D is another cross-sectional view of an embodiment of light integrating column 100, showing the steady state of light 209 in light integrating column 100. Internal light reflection of input light from external light source 210 results in a diffused, uniform column of light 202 exiting through the light output window or second window 108. Diffused column of light 202 exiting second window 108 does not retain vestiges of uneven intensity resulting from individual light sources. Instead, diffuse column of light 202 maintains uniform intensity throughout.

Figure 3A:
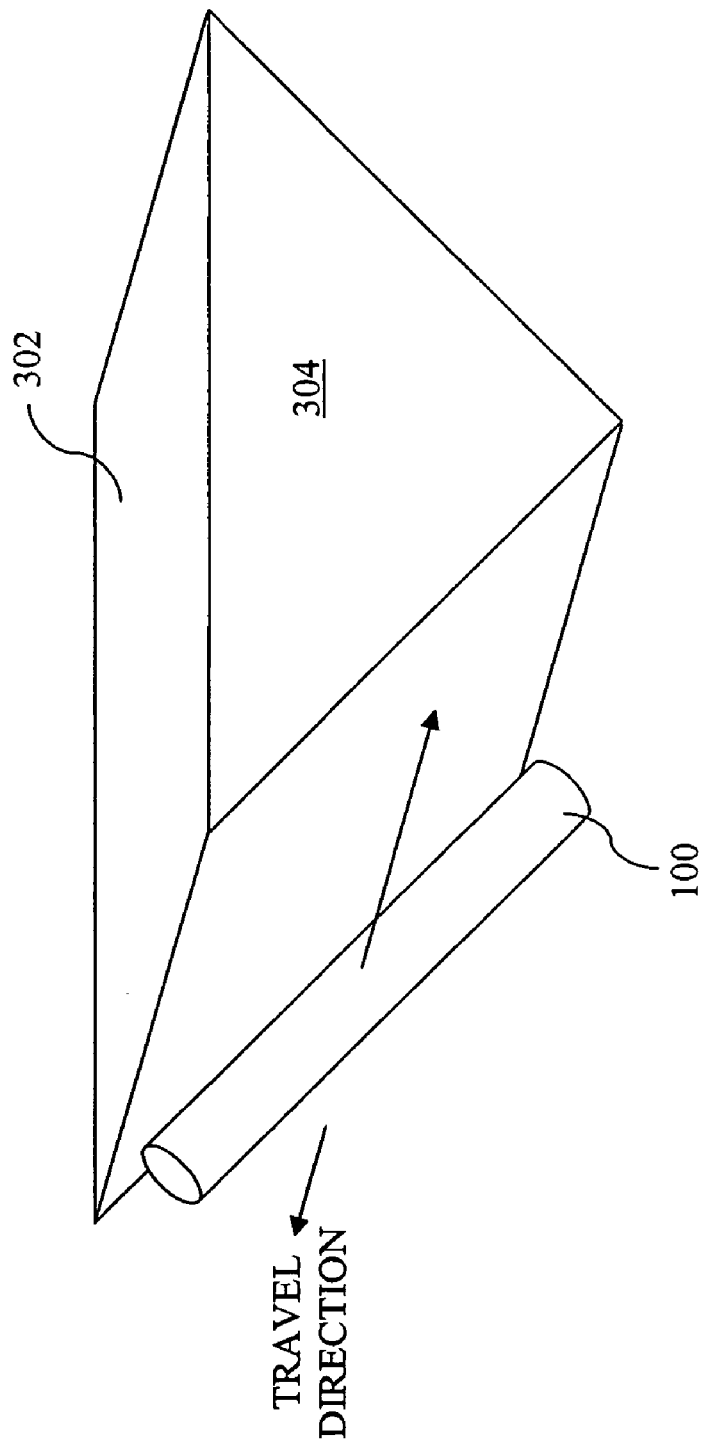
FIG. 3A is a diagram illustrating an embodiment of the present invention, wherein a light integrating column according to the present invention is used to illuminate the underside of a platen.

FIG. 3A is a diagram that illustrates light integrating column 100 illuminating the underside of a platen surface 302 according to an embodiment of the present invention. In FIG. 3A, platen surface 302 is a surface of a prism 304. Platen surface 302 can be, but is not limited to, a top surface of prism 304, a layer of transparent material placed on top of prism 304, or another surface known to one skilled in the art. Light integrating column 100 illuminates the underside of platen 302 by moving along the travel direction, as shown in FIG. 3A.

Figure 3B:
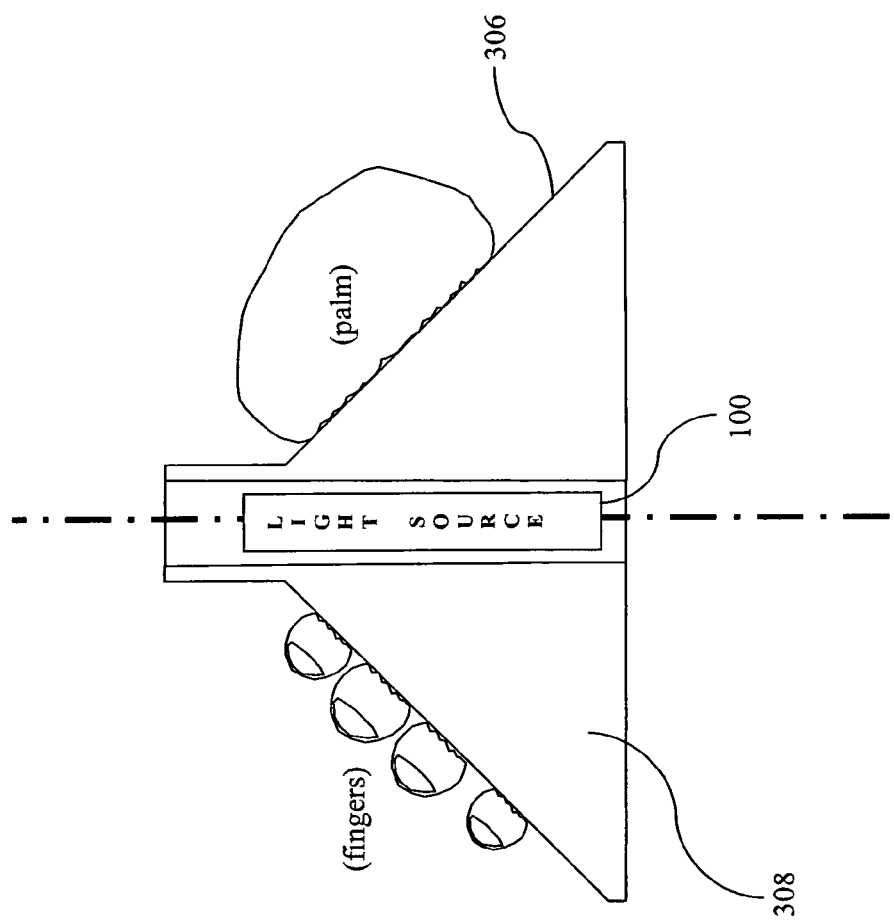
FIG. 3B is a diagram illustrating an embodiment of the present invention, wherein a light integrating column according to the present invention is used to illuminate the interior of a curved platen.

FIG. 3B is a diagram of an embodiment of the present invention, in which light integrating column 100 illuminates the interior of a curved platen 306. In an embodiment, curved platen 306 is the surface of a conical prism 308. Light integrating column 100 is inserted into a hollowed-out portion of the curved prism 308. In another embodiment, curved platen 306 is the surface of a cylindrical prism. One of skill in the art will recognize that light integrating column 100 given this description may be used to illuminate the interior of any non-flat or contoured platen surface or prism.

Example embodiments of the methods, systems, and components of the present invention have been described herein. As noted elsewhere, these example embodiments have been described for illustrative purposes only, and are not limiting. Other embodiments are possible and are covered by the invention. Such embodiments will be apparent will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. An apparatus for generating a linear diffused uniform light, comprising:
    a solid illumination column comprising a light transmissive material;
    a first window in said illumination column for receiving light; and
    a second window in said illumination column for transmitting diffused uniform light out of said illumination column,
    wherein said second window in said illumination column is placed at an angle with respect to said first window in said illumination column, and
    wherein said illumination column internally reflects and diffuses the received light to generate the diffused uniform light, which is transmitted through said second window.

2. The apparatus of claim 1, wherein said linear diffused uniform light illuminates a platen surface in a biometric system.

3. The apparatus of claim 1, wherein said second window in said illumination column is formed at an approximately ninety degree angle with respect to said first window in said illumination column.

4. The apparatus of claim 1, wherein said illumination column is covered with a reflective material.

5. The apparatus of claim 4, wherein said first and second windows are portions of said illumination column that are not covered with said reflective material.

6. The apparatus of claim 1, wherein said first or second windows are areas on a surface of said solid illumination column that are convex relative to the surface of said solid illumination column.

7. The apparatus of claim 1, wherein said first or second windows are areas on a surface of said solid illumination column that are concave relative to the surface of said solid illumination column.

8. The apparatus of claim 1, wherein said first or second windows are areas on a surface of said solid illumination column that are flat relative to the surface of said solid illumination column.

9. The apparatus of claim 1, wherein said material capable of light transmission comprises at least one material of the group consisting of glass, fused silica, and plastic.

10. The apparatus of claim 1, further comprising:
    a light source, proximate to said first window, that emits light.

11. The apparatus of claim 10, wherein said light source is aligned with said first window in said illumination column.

12. The apparatus of claim 11, wherein said light source comprises:
    an array of light emitting diodes.

13. The apparatus of claim 11, wherein said light source comprises:
    a linear light source.

14. A light integrating column for live scanning of a print image on a platen surface, comprising:
    a solid illumination column having a first window and a second window; and
    a reflective coating on a surface of said solid illumination column,
    wherein said reflective coating comprises
        a first opening aligned with said first window, and
        a second opening aligned with said second window.

15. The diffuser of claim 14, wherein said solid illumination column comprises a light-transparent material.

16. A live scanner, comprising:
    a platen surface that receives a print pattern including ridges and valleys; and
    a solid light integrating column that generates a diffused, uniform light to illuminate the platen surface,
    wherein said integrating column comprises an illumination column having first and second windows.

* * * * *